United States Patent [19]

Broussard, Jr. et al.

[11] 3,915,780

[45] Oct. 28, 1975

[54] EXTRUDED EPOXY PACKAGING SYSTEM

[75] Inventors: Louis Walter Broussard, Jr., Missouri City; Stephen Sydney Baird, Richardson, both of Tex.

[73] Assignee: Texas Instruments Incorporated, Dallas, Tex.

[22] Filed: Aug. 2, 1973

[21] Appl. No.: 385,199

[52] U.S. Cl. .................... 156/244; 29/588; 264/272
[51] Int. Cl.² ... B29B 3/02; B29C 27/18; B29F 3/00
[58] Field of Search ...... 156/244, 330, 243; 29/588; 264/176 R, 272, DIG. 59

[56] References Cited
UNITED STATES PATENTS

| | | | |
|---|---|---|---|
| 2,710,909 | 6/1955 | Logan et al. | 264/272 |
| 3,499,816 | 3/1970 | Areskoug | 156/244 |
| 3,788,895 | 1/1974 | Schimmer et al. | 29/588 |

OTHER PUBLICATIONS

"Electronic Circuit Encapsulation" Henry G. Manfield, Beama Electrical Insulation Conference, London, England (4/70), pp.1-13.

*Primary Examiner*—Caleb Weston
*Attorney, Agent, or Firm*—Hal Levine; James T. Comfort; Gary C. Honeycutt

[57] ABSTRACT

The disclosure relates to an assembly and packaging system for fabrication of integrated circuits and the like wherein a continuous strip of a polymer film having integrated circuits thereon has leads attached thereto and is then fed between a pair of strips of epoxy encapsulating material. The encapsulating material is an extruded partially cured epoxy which is quickly cooled when leaving the extruder and then heated and substantially fully cured while being positioned on each side of the polymer film strip. The layers of epoxy are then sealed together and substantially cured around the integrated circuits by means of a pair of heated rollers to encapsulate the circuit on-line in a continuous operation.

6 Claims, 2 Drawing Figures

U.S. Patent   Oct. 28, 1975   3,915,780
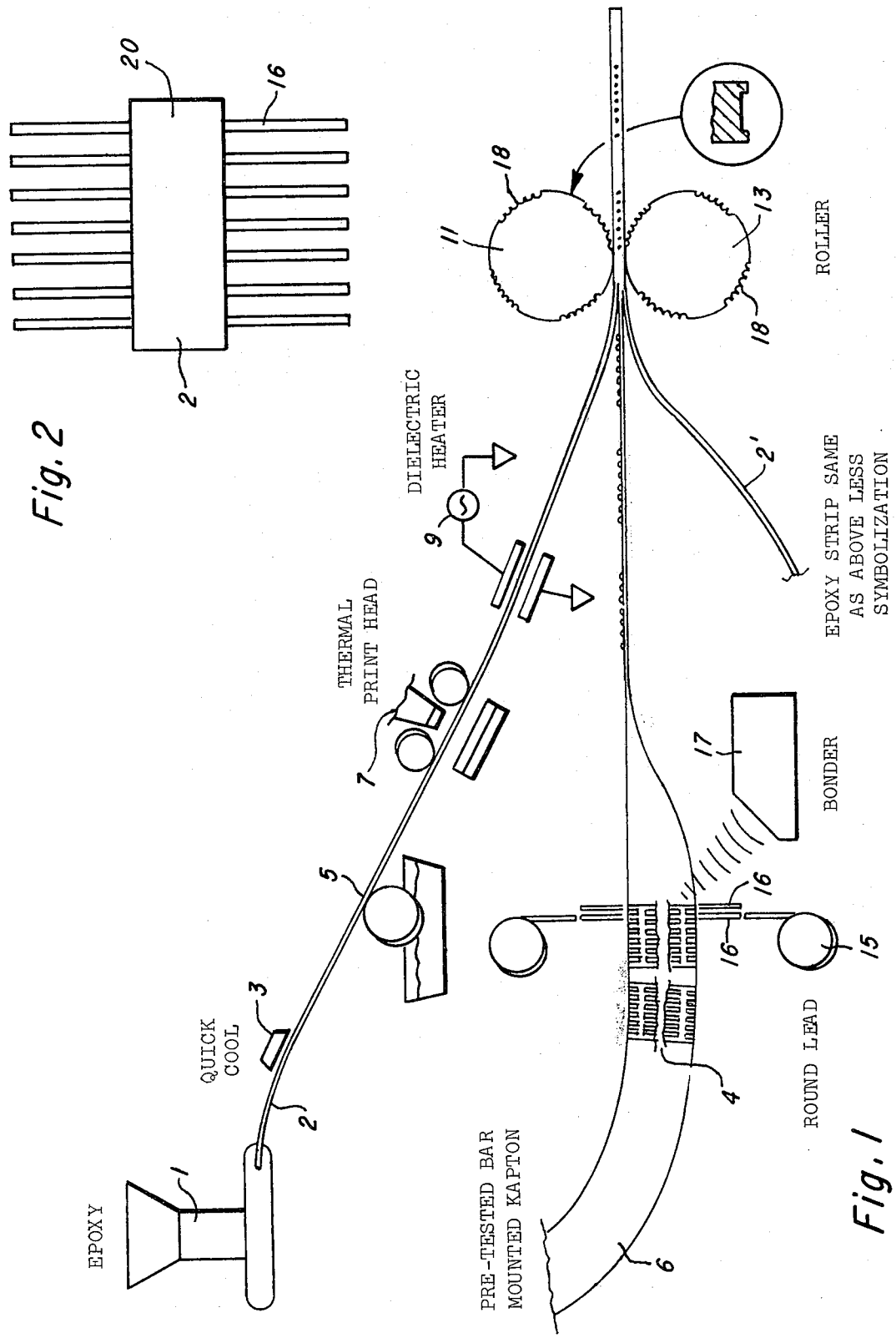

EXTRUDED EPOXY PACKAGING SYSTEM

This invention relates to a system of plastic encapsulation of semiconductor devices such as integrated circuits and, more specifically, to an extrusion assembly process wherein a plastic, preferably an epoxy resin, is continuously formed over a series of semiconductor devices to provide a continuous assembly thereof.

The semiconductor packaging art has been gradually turning to plastic encapsulation in view of the many advantages thereof. The present art provides this plastic encapsulation by using injection or transfer mold techniques. These techniques present the problem of not being susceptible to a continuous on-line encapsulation process. Furthermore, these prior art encapsulating systems do not permit a mix of semiconductor wafers or a test procedure as part of a one step encapsulating process. The high costs involved in handling are therefore apparent.

In accordance with the present invention, there is provided an assembly and packaging system suited for fabrication of integrated circuits having relatively low cost, which makes maximum use of raw materials, provides a short, computer controlled manufacturing cycle time and provides for a one step on-line encapsulation and testing system. Briefly, in accordance with the present invention, an extruded epoxy is provided rather than the injection or transfer molded epoxy of the prior art. A screw extruder operates continuously producing two forms which will become the upper and lower halves of the completed device. The composition of the epoxy will vary from that which is presently used for injection or transfer molding in that it will normally have a higher percentage of filler and coupling agent and little or no mold release. This will reduce the cost of the plastic used in the end product, while providing a more nearly optimum thermal expansion coefficient. Also, since the real-time bulk requirements for epoxy is small, a low cost epoxy grinding and blending system can be incorporated as a part of the overall manufacturing system. This sub-system would pneumatically distribute resin on an as-needed and special formulation basis which would further reduce the basic plastic cost.

The extrusion process produces two plastic strip forms which are rapidly cooled to temporarily slow down the polymerization process. In this state, the epoxy will exhibit characteristics similar to thermoplastic material. The section that will become the top half of the package is symbolized. A programmable symbolization station uses a thermal print heat to release a colored powder from a plastic tape. The powder is transferred to the surface of the strip and will eventually be imbedded into the surface at a later operation.

A continuous strip of polyimide or other suitable film on which a semiconductor has been bonded, flip-chip or reflow soldered to a metallized lead pattern and tested is introduced into the system. The leads required to interconnect the film to the package exterior are continuously fabricated on an as-needed basis. Nickel-plated steel wire in roll form is preheated to about 300°C. in an induction heater, cut to the required length, tin-dipped and positioned over the bonding pads on the film. A low power RF, IR or laser generator is used to provide the heat differential required for good solder filleting of the wire to film. The next step is to spray a solution of coupling agent and water over the film assembly, in particular, on the leads. Complete drying of the coupling agent is performed by hot air or low intensity IR.

The two epoxy strips are preheated to accelerate the polymerization of the plastic and positioned to form a sandwich structure with the film assembly. The composite then passes through rollers which compress the structure into the DIP cross section. Notches are included on the rollers' edge to accommodate the wire leads and provide a cosmetically acceptable interface between the lead and package body. The wire leads are molecularily bonded to the epoxy through the coupling agent. To convert the system from 16-lead devices to 64-lead would require changing the rollers to accommodate the correct lead spacing.

The final operation would include testing device performance specifications, separation of individual devices by a cutter blade, lead forming (if required), and packing into a suitable container. If separation is performed by shearing rather than sawing, a flange is produced which would function as a package standoff.

It is therefore an object of this invention to provide a continuous, on-line system for encapsulating semiconductor devices.

It is a further object of this invention to provide a system for encapsulating semiconductor devices using extruded epoxy resins.

It is a still further object of this invention to provide a system for encapsulating semiconductor devices using a filled epoxy having preselected coefficient of thermal expansion.

It is a yet further object of this invention to provide a system for encapsulation of semiconductor devices utilizing an extruded, filled, partially cured epoxy encapsulating material.

The above objects and still further objects of the invention will immediately become apparent to those skilled in the art after consideration of the following preferred embodiment thereof, which is provided by way of example and not by way of limitation, whrein:

FIG. 1 is a diagram of the assembly process in accordance with the present invention; and FIG. 2 shows a completed package in accordance with the present invention.

Referring to FIG. 1, there is shown a screw extruder 1 which extrudes partially cured thermoset epoxy film 2 and quickly cools it in air blast 3. This prevents complete curing of the epoxy. A coupling agent 5 can then be transferred onto the film 2 to provide chemical bonding between the epoxy and the semiconductor leads. Such coupling materials are the substitued silanes, such as gamma amino propyl triethylethoxy silane or a cyclohexyl epoxy propyl trimethoxy silane. These are merely exemplary, other coupling agents between an epoxy and other surface being well known to those skilled in the art. The thermal printer 7 is then provided which can be a heat transfer ink on paper or a machine for embossing numbers onto the film 2. The partially cured epoxy film 2 is fed through a dielectric heater 9 to soften the plastic and start the remainder of the curing thereof. The film 2 is then fed between a pair of cold rollers 11 and 13, it being noted that a second identical film 2' formed in the same manner as film 2 is also fed between rollers 11 and 13 with a strip of material with semiconductor devices thereon (to be explained hereinbelow) sandwiched between films 2 and 2' under the rollers. The rollers 11 and 13 can be heated to complete the curing of the epoxy films 2 and 2' if desired.

The epoxy film 2 is keyed in line with the semiconductor devices which are coming along on the pretested bar mounted Kapton film or the like as is well known in the art. These are unencapsulated integrated circuits 4 which are face bonded or bump mounted to the Kapton film 6 which is a contact system involving no wires but merely metal bumps. This type of bonding is well known. A spool of wire 15 is cut to predetermined length and provides leads 16.

The wire from which the leads 16 are provided can be formed of any metal which will bond to the sections on the metal bumps on the film 6, the patterns being etched and connecting the lead to the bump. If a nickel pattern is used on the bumps, a nickel wire can be used. The leads can be formed and applied to the patterns by applying the leads, bonding and then shearing the wire, one at a time or several at a time if several spools of wire are used. As an alternative, one or plural spools can be used and the wire applied to a gripper, sheared and then bonded to the patterns. In all cases, the shearing of the wire should be in a direction away from the film 6 so that burrs which are formed during shearing are on the top side of the wire and do not contact the patterns during bonding to provide a good bond.

The bonding of the wire takes place with a bonder 17, such as a microwave bonder, heat, pulse, resistance bonding, hot air blast through a hypodermic needle or any other appropriate bonding technique.

This is done prior to the movement of the semiconductor devices on the film 6 between the layers of epoxy 2 and 2'. The rollers 11 and 13 then press the epoxy layers 2 and 2' together, the epoxy being formed over the leads 16 by the notches 18 in the roller perimeter which are spaced to accommodate the lead pattern and bond the epoxy around and to the leads to complete the device. The completed devices can then be put into an oven for post curing, testing, etc. The completed device has the leads therein, is encapsulated and has the markings thereon.

A subsequent step that can be performed is to deform the leads 16 into a dual in-line(DIP) shape or to leave them flat depending upon the application required.

The purpose in the extrude, quick cool and reheat steps is to advance the cure of the epoxy to approximately 50% to 80% and preferably 60% of its capability to cure so that it gets efficient cure to hold its shape and yet is still sufficiently short of complete curing to become plastic when reheated by heater 9. The percentage of curing will depend upon the particular epoxy material being used.

The advantage of this technique is that it is possible to go to a much higher filler loading of the epoxy. This has two advantages, one being a reduction of the cost of the material, and secondly, a reduction and/or selection of the thermal expansion coefficient to the extent that it can be matched to the metal lead frame. Therefore it is possible to use even 85% to 90% filler in the epoxy and still be able to extrude and thereby arrange the filler material to provide the proper coefficient of expansion. High flow rates of material are not required in this case. The filler materials are well known in the art and can be silica flour, asbestos, tabular alumina, hydrated alumina, and various natural minerals such as walstonite, calcium silicate, sodium aluminum silicate, lithium aluminum silicate and the like. Any standard epoxy transfer mold compound with the modification of the formula to increase the filler content and extend gel time can be used. These are all well known materials of epoxy technology.

A further additional advantage is that once the formulation is determined, it is possible to formulate the epoxy in the extruder so the components or film 2 can be placed in the hopper of the extruder 1, then formulated in the extruder and the formulated material can be extruded. In other words, the materials would be separate and the inventory would only be of the epoxy components. The formulation of the epoxy would than be done at the same time as the extrusion.

The entire extrusion can be done in one piece on both sides of film 6 similar to the way electric cables are jacketed. Cables are normally jacketed with a thermoplastic material.

Referring now to FIG. 2, there is shown a completed semiconductor package having leads 16, a film 2 and the top surface therof and printing 20.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A method for the assembly of a packaged semiconductor device comprising the steps of:
    extruding in a partially cured state first and second plastic strips of epoxy resin film having a high filler content, and rapidly cooling the extruded strips to slow the curing process;
    feeding the strips in a parallel relationship toward a compression station for sandwiching the strips together;
    reheating at least one of said strips just prior to entering said compression station for the purpose of resoftening the film to permit bonding of said strips in said compression station; and
    feeding between the epoxy strips a third plastic strip having mounted thereon a plurality of spaced semiconductor devices, and causing said third strip to be sandwiched between said first and second plastic strips at said compression station to encapsulate said devices.

2. A method as in claim 1 wherein the epoxy of said extruded strips contains at least about 85% filler.

3. A method as in claim 1 further including the step of adding a coupling agent to at least one of said epoxy strips to enhance the bonding of said strips at said compression station.

4. A method as in claim 1 wherin said third plastic strip comprises a polyimide resin.

5. A method as in claim 1 futher including the step of bonding metal leads to said semiconductor devices on said third plastic strip.

6. A method as in claim 5 wherein said lead bonding operation includes the steps of feeding wire from each of two spools provided on opposite sides of said third plastic strip, bonding the tip of each said wire in successive steps to a semiconductor terminal pad, and then severing the bonded wire to a suitable length.

* * * * *